Aug. 17, 1965    J. STIELER ETAL    3,201,102
SINTERING APPARATUS

Filed Aug. 11, 1961    2 Sheets-Sheet 1

*Inventor:*
*Jürg Stieler*
*Dietrich Münch*
BY Bailey, Stephens & Huettig
ATTORNEYS Aug. 17, 1965   J. STIELER ETAL   3,201,102
SINTERING APPARATUS
Filed Aug. 11, 1961   2 Sheets-Sheet 2

*Inventor:*
Jürg Stieler
Dietrich Münch
BY Bailey, Stephens + Huettig
ATTORNEYS

United States Patent Office 3,201,102
Patented Aug. 17, 1965

3,201,102
SINTERING APPARATUS
Jürg Stieler and Dietrich Münch, Frankfurt am Main, Germany, assignors to Metallgesellschaft Aktiengesellschaft, Frankfurt am Main, Germany
Filed Aug. 11, 1961, Ser. No. 131,009
Claims priority, application Germany, Feb. 14, 1958, M 36,710; Apr. 18, 1958, M 37,378
7 Claims. (Cl. 266—21)

This application is a continuation-in-part of our co-pending application Serial No. 793,560, filed Feb. 16, 1959, for Sintering Apparatus and now abandoned. This invention relates to a sintering appartus and, in particular, is directed to an improved arrangement of the outlet sprocket to compensate for deformations occurring due to temperature changes in the apparatus.

The sinterging apparatus in this case is a so-called sintering band composed of a series of pallets or pans mounted on wheels which roll on tracks and form an endless band having upper and lower reaches. The pans are pushed by a lifting sprocket wheel and push each other along the upper reach of the continuous band extending to the discharge end. In older constructions of sintering apparatus, the upper reach of the sintering machine is longer than the sum of the lengths of the individual pans along the upper reach, the difference being generally in the order of inches, such as 8 to 12 or 15 inches. Thus, as each pan which has traversed the upper reach of the machine comes to the end of the upper reach to adjacent where it is lowered along curved rails by gravity, it must be moved further through a distance equal to the difference between the length of the pallet upper reach and the sum of the lengths of the individual pans along the upper reach. Each pan moves downwardly by gravity until it strikes the next preceding pan which has moved downwardly just ahead of it. The striking of each pan against the next preceding pan imparts an impact to both, thus damaging and deforming each other.

To avoid such damage, in more modern constructions, the pans are taken over individually at the discharge end of the band by an outlet pan lowering sprocket wheel, which separates the leading pan from the line of pans on the upper reach, guides it to the lower reach of the band, and returns it inverted along the lower reach of the band to the lifting sprocket wheel on the fresh material charging end of the band. Such a band is shown generally in Davis U.S. Patent No. 2,826,487. At the lowering sprocket, the wheels or axles of the pans engage with the teeth of the sprocket, and the weight of the pans tends to rotate the sprocket in the direction of the travel of the pans. This holding of the pan on the sprocket prevents the pan from falling unbraked for any relatively long distance, and thus prevents the pans from bumping preceding pans and damaging each other.

During their travel on the upper reach of the band, the pans contact each other with no space therebetween because they are pushed forward by means of the lifting sprocket wheel. As the pans become highly heated on the upper reach of the band by reason of the sinter material carried by the pans, and as a thermal expansion occurs, it is necessary to provide a certain safety gap between the leading pan on the upper reach of the band and the preceding pan taken over by the outlet lowering sprocket.

In heretofore known sintering bands, the mentioned safety gap is left relatively wide when the apparatus is cold so that this gap will be reduced, as much as possible, to the smallest size after the apparatus reaches a constant hot operating temperature. This gap is formed by adjusting the bearing of the outlet lowering sprocket by means of screws, wedges, and the like. This adjustment of a fixed gap has the disadvantage in that, before the apparatus has become heated to a constant operating temperature, a fairly large gap is left between the leading pan on the upper reach of the band and the preceding pan for a time which may be as great as four hours or about 6 pan cycles; and during this time, a substantial quantity of sintered material drops down through the gap and fouls the outlet lowering sprocket despite attempts to catch the material in chutes and the like. As, in the normal operation of a sintering band, temporary stoppages happen fairly frequently, the existence of a gap is a constant difficulty. Moreover, in the usual sintering band, it is very difficult to adjust the width of the gap while the apparatus is in operation and being changed to perform under a varied condition, such as higher output, higher sintering temperature, or the like.

The object of this invention is to improve the mounting of the outlet lowering sprocket so that under all operating conditions, beginning with a cold starting, practically no gap exists between the leading pan on the upper reach on the band and the preceding pan, and still the pans are free to expand and contract under the influence of changing thermal conditions.

In general, these objects are obtained by using an upper reach of practically the same length as the sum of the lengths of the individual pans along the upper reach so that practically no gaps or, at the most, only a gap of a few millimeters, such as 1 to 3 millimeters, exists between any pans, and mounting an outlet sprocket wheel at the end of the upper reach in such a way that it moves automatically to compensate for temperature changes. This is done by mounting the outlet sprocket for movement longitudinally of the sinter band or by hinging the sprocket for swinging movement. Consequently, the sprocket is movable both in the direction and counter to the direction of the movement of the pans on the upper reach of the band, with the movement being produced on the one hand by the heat expansion of the apparatus, including the pans, and by appropriately applied counteracting forces on the other hand.

In this way, it is possible to maintain a tight train of pans without any gap between adjacent pans even at the discharge end, and still to leave all pans sufficiently freedom to expand and to contract according to the changing temperature conditions.

The arrangement in accordance with the invention also comprises devices with other equivalents to a sprocket wheel for transferring the pallets from the upper to the lower reach of the apparatus, such as a sprocket ring without spokes, which is mounted directly on a ball bearing ring.

The means by which the objects of the invention are obtained are described more fully with reference to the accompanying drawings, in which.

Figure 1:
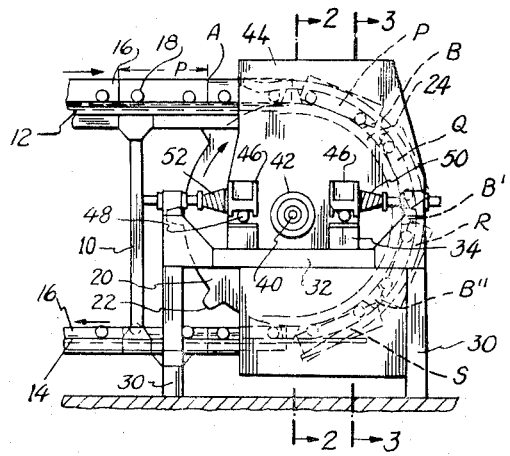
FIGURE 1 is a side elevational view of the outlet end of a sintering band.
Figure 2:
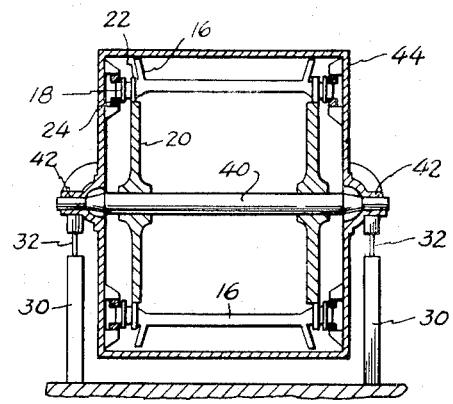
FIGURE 2 is a cross-sectional view on the line 2—2 of FIGURE 1.
Figure 3:
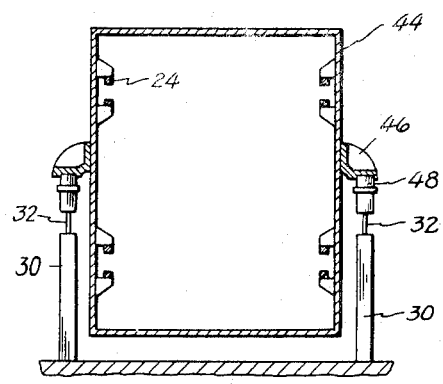
FIGURE 3 is a cross-sectional view on the line 3—3 of FIGURE 1.

A conventional sintering band is composed of a supporting structure 10 carrying rails 12 on its upper reach and rails 14 on its lower reach. Sinter pans 16 mounted on wheels 18 ride on the rails. In the upper reach, pans 16 are pushed by the lifting wheel of the band in the direction of the arrow. At the outlet end of frame 10 is a sprocket wheel 20 having teeth 22 which engage either the wheels or axles of each pan, separate the single pans one from another during their descent, i.e., after the end of the upper reach, and hold the pans as they are turned downwardly around the sprocket until they reach the lower rails 14. In the turning path, the wheels are guided by the curved rail 24. The sprocket turns clockwise, as indicated by the arrow.

Also in a conventional sintering band, the sprocket wheel 20 is not positioned at the end of the upper reach, but some distance before it. Therefore the sprocket can not guide the pans from the upper to the lower reach, but the pans fall freely downward by gravity.

Furthermore, in a conventional sintering band, the total length of the rails 12, 14 and 24 is made from about 8 to 15 inches longer than the sum of the individual pan lengths. Thereby a substantial gap of about 8 to 15 inches is formed between the foremost pan of the upper reach and the preceding pan which begins its down fall. As the sinter cake breaks up at the discharge end into lumps of varying sizes from about fist size to much larger chunks, and as there are no walls across the ends of the pans, sinter material will spill out from both the leading and following pans and drop through the gap to foul the lowering sprocket. In this invention, the sum of the lengths of the rails 12, 14 and 24 is made practically equal to the sum of the individual pan lengths P so that, along with additional means, no appreciable gap occurs at the position A in either the cold or hot condition of the sintering band. Even if small gaps B, B' and B" of a few mm., such as 1 to 3 mm. or even 10 mm. are formed between the downgoing pans P, Q and R, these gaps are so much smaller than the chunks of sinter cake, that no sinter can fall through the gaps.

According to this invention, sprocket 20 is mounted for movement to compensate for the heat expansion and contraction of the apparatus, and still be able to guide the pans individually and separated from each other from the upper to the lower reach. Four posts 30 are connected by longitudinally extending crossbeams 32, upon which are secured base plates 34.

Sprocket 20 is carried by an axle 40 at the extreme discharge end of the upper reach. This axle is journalled in bearings 42 secured to a housing 44 which covers the tops and longitudinal sides of the sprocket. A pair of flanged plates 46 are secured to the outer wall of the housing on opposite sides of axle 40 and above plates 34. Rollers 48 are mounted between flanged plates 46 and base plates 34. A compression spring 50 is interposed between flanged plate 46 and the upper ends of posts 30, which provides a counter force against the incoming pans (to the left in FIG. 1). An especial smooth operation can be achieved by providing another compression spring 52, acting against spring 50, care being taken that the spring 50 is dimensioned so much stronger than spring 52 as to provide a sufficient differential force in the direction to the left of FIG. 1.

In operation, the pans 16 on rails 12 of the upper reach of the band are pushed along until they are engaged by the teeth 22 of sprocket 20 and move downwardly supported by the curved rails 24. The sprocket wheel 20 pushes against the pan being engaged in the upper reach and is adjusted so that there is no gap between the leading pan on the upper reach of the band and the preceding pan just engaged when the apparatus is cold. As the apparatus heats during the sintering of material in the pans and the pans and associated structure expand, the position of axle 40 is shifted to the right in FIGURE 1 by the forces of heat expansion, the position of housing 44 being permitted by the movement of plates 46 on rollers 48. This movement is resisted by the spring device 50. When the apparatus cools, the spring 50 shifts the housing back to the left in FIGURE 1 with undue movement being resisted by the pressure of springs 52 on the left side of FIGURE 1. This produces a closed system composed of a tight train of pans with the pans held in contact with each other on the entire length of the upper and lower reaches during the thermal expansion and contraction of the apparatus. Consequently, there is no gap at position A between the leading pan on the upper reach of the band and the preceding pan on the sprocket regardless of the temperature of the apparatus, and neither any substantial gap at position B.

Figure 4:
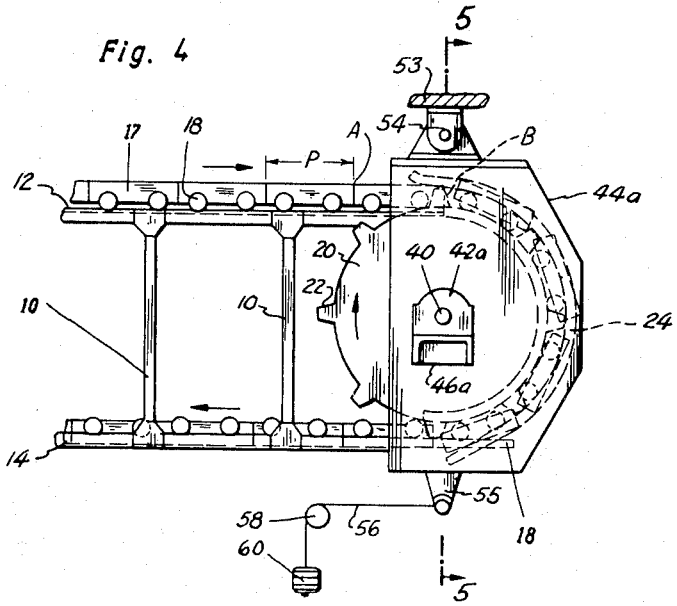
FIGURE 4 is a view similar to FIGURE 1 showing a modified form of the invention.
Figure 5:
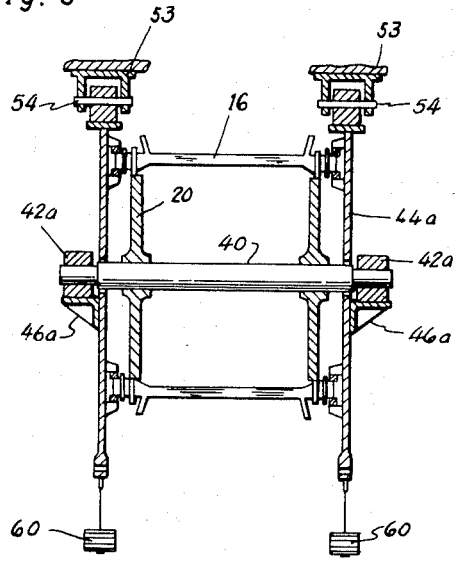
FIGURE 5 is a cross-sectional view on the line 5—5 of FIGURE 4.

In FIGURES 4 and 5, the housing 44a for the sprocket 20 is suspended from a frame 53 by means of a hinge 54 fastened to the frame and to the top of the housing so that the housing can swing like a pendulum. The sprocket wheel thus can move in response to the heat expansion of the sinter apparatus. The axle 40 is journalled in bearings 42a which rest on brackets 46a secured to the longitudinal walls of the housing. The axis of axle 40 and the hinge 54 are mounted in substantially the same vertical plane which is located at a position where there is no gap at position A between the leading pan on the upper reach of the band and the preceding pan when the apparatus is cold. To give a force for urging housing 44a against heat expansion, an arm 55 is secured to the bottom of housing 44a from which a flexible cable 56 extends over a sheave 58 to hang a weight 60, this being offset from the vertical plane of axle 40 in the direction of the opposite end of the apparatus. A lever fulcrumed to frame 10 can be substituted for the flexible cable. Moreover, the housing 44a can be hinged on its bottom and held by a weight similar to weight 60 or by other means joined to its top for urging it against heat expansion.

In operation, the modification of FIGURES 4 and 5 also ensures that there is no gap between the leading pan on the upper reach of the band and the preceding one while the apparatus is cold. Upon heating of the apparatus, the expansion will cause axle 40 to move to the right, this movement being permitted by hinge 54 while an opposed force is provided by weight 60.

Having now described the means by which the objects of the invention are obtained,

We claim:

1. A sintering apparatus comprising an endless sintering band having an upper and a lower reach, a train of abutting sinter material carrying pans on said upper reach, said upper reach having a length substantially equal to the sum of the lengths of the individual pans thereon, a pan lowering mounting at one end of said band composed of a housing having a freely rotatable pan outlet lowering sprocket journalled therein at the extreme discharge end of said upper reach, said sprocket engaging each of said pans and holding them in fixed spaced relation to each other as the sprocket is turned by the weight of the pans and the pans are carried by and turned downwardly around said sprocket during the whole descent of said pans from the upper to the lower reach, housing supporting means for allowing said sprocket to move in and counter to the direction of conveyance of the sintering band, and means constantly urging said sprocket counter to the direction of conveyance which said pans have when they are in the upper reach so that a closed system consisting of a tight train of pans is formed with the pans held in contact with each other by said means constantly urging said sprocket on the entire length of the upper and lower reaches during the thermal expansion and contraction of said apparatus.

2. A sintering apparatus as in claim 1, said housing being mounted in a horizontally slidable frame work.

3. A sintering apparatus as in claim 2, said means constantly urging said sprocket comprising spring means.

4. A sintering apparatus as in claim 1, said housing supporting means comprising hinge means for hanging said housing.

5. A sintering apparatus as in claim 4, further comprising force means acting in the horizontal direction counter to the direction of conveyance of pans on the upper reach of the sinter band which is applied to the opposite end of the hinge point of the swinging sprocket containing housing.

6. A sintering apparatus as in claim 5, said force means comprising a weight, and cable means hanging said weight in a plane offset from the vertical plane of said hinge means and connecting said weight to said housing.

7. A sintering apparatus as in claim 6, said housing supporting means comprising a separate support for each longitudinal side of said housing.

References Cited by the Examiner

UNITED STATES PATENTS

| | | | |
|---|---|---|---|
| 1,469,521 | 10/23 | Lloyd | 266—21 |
| 2,745,659 | 5/56 | Osojnak | 266—21 |

FOREIGN PATENTS

| | | |
|---|---|---|
| 589,984 | 12/33 | Germany. |
| 593,942 | 3/34 | Germany. |
| 378,334 | 8/32 | Great Britain. |

JOHN F. CAMPBELL, *Primary Examiner.*

MORRIS O. WOLK, RAY K. WINDHAM, WHITMORE A. WILTZ, *Examiners.*